US012589314B2

(12) United States Patent
Otomo

(10) Patent No.: US 12,589,314 B2
(45) Date of Patent: Mar. 31, 2026

(54) RECORDING MEDIUM AND INFORMATION PROCESSING DEVICE THAT GUIDE USER TO UTILIZE PLURAL FUNCTIONS

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 350 days.

(21) Appl. No.: 18/127,793

(22) Filed: Mar. 29, 2023

(65) Prior Publication Data

US 2023/0226452 A1 Jul. 20, 2023

Related U.S. Application Data

(63) Continuation of application No. PCT/JP2021/037073, filed on Oct. 7, 2021.

(30) Foreign Application Priority Data

Oct. 1, 2020 (JP) ................................. 2020-167266

(51) Int. Cl.
*A63F 13/792* (2014.01)
*A63F 13/798* (2014.01)

(52) U.S. Cl.
CPC .......... *A63F 13/792* (2014.09); *A63F 13/798* (2014.09)

(58) Field of Classification Search
CPC ............................... A63F 13/69; A63F 13/792
See application file for complete search history.

(56) References Cited

U.S. PATENT DOCUMENTS

| | | | | |
|---|---|---|---|---|
| 2007/0129126 | A1* | 6/2007 | Van Luchene | G06Q 30/04 463/1 |
| 2014/0162765 | A1* | 6/2014 | Bai | A63F 13/69 463/25 |
| 2018/0126280 | A1* | 5/2018 | Holtz | A63F 13/79 |

(Continued)

FOREIGN PATENT DOCUMENTS

| | | |
|---|---|---|
| JP | 2017-174365 A | 9/2017 |
| JP | 6335997 B2 | 5/2018 |
| JP | 2020-103399 A | 7/2020 |

OTHER PUBLICATIONS

International Search Report issued in corresponding International Application No. PCT/JP2021/037073 mailed Nov. 30, 2021(5 pages).

(Continued)

*Primary Examiner* — Jay Trent Liddle
(74) *Attorney, Agent, or Firm* — Osha Bergman Watanabe & Burton LLP

(57) ABSTRACT

A non-transitory computer readable recording medium storing instructions that guide a user using a function to use another function among plural functions given by an information processing device, the instructions causing a computer to execute: giving preferential treatment to the user playing a first game depending on a first usage charge in the first game; acquiring usage information indicating a second usage charge in a second game; giving a predetermined license to the user, regardless of the first usage charge, under a condition that the second usage charge is equal to or greater than a certain amount; and giving the preferential treatment, in the first game, to the user who has given the predetermined license.

9 Claims, 8 Drawing Sheets

60

---

Rank Change Notification

62

You have been promoted from "buck private" to "private first class"!

Current spending amount: ¥12,000
(Remaining until next rank: ¥8,000)

Current Preferential Treatment Details 64

· Stamina recovery at no charge (once per day)
· Increase character possession limit by 20

(56) References Cited

U.S. PATENT DOCUMENTS

| | | | | |
|---|---|---|---|---|
| 2018/0165700 A1* | 6/2018 | Onda | .................... | A63F 13/798 |
| 2018/0165701 A1* | 6/2018 | Onda | ..................... | A63F 13/30 |
| 2020/0047072 A1* | 2/2020 | Patenge | ................. | A63F 13/35 |
| 2020/0353367 A1* | 11/2020 | Palmer | ................... | A63F 13/65 |
| 2023/0226452 A1* | 7/2023 | Otomo | .................... | A63F 13/35 |
| | | | | 463/25 |

OTHER PUBLICATIONS

Written Opinion issued in corresponding International Application No. PCT/JP2021/037073 mailed Nov. 30, 2021 (4 pages).

* cited by examiner

Figure 7:
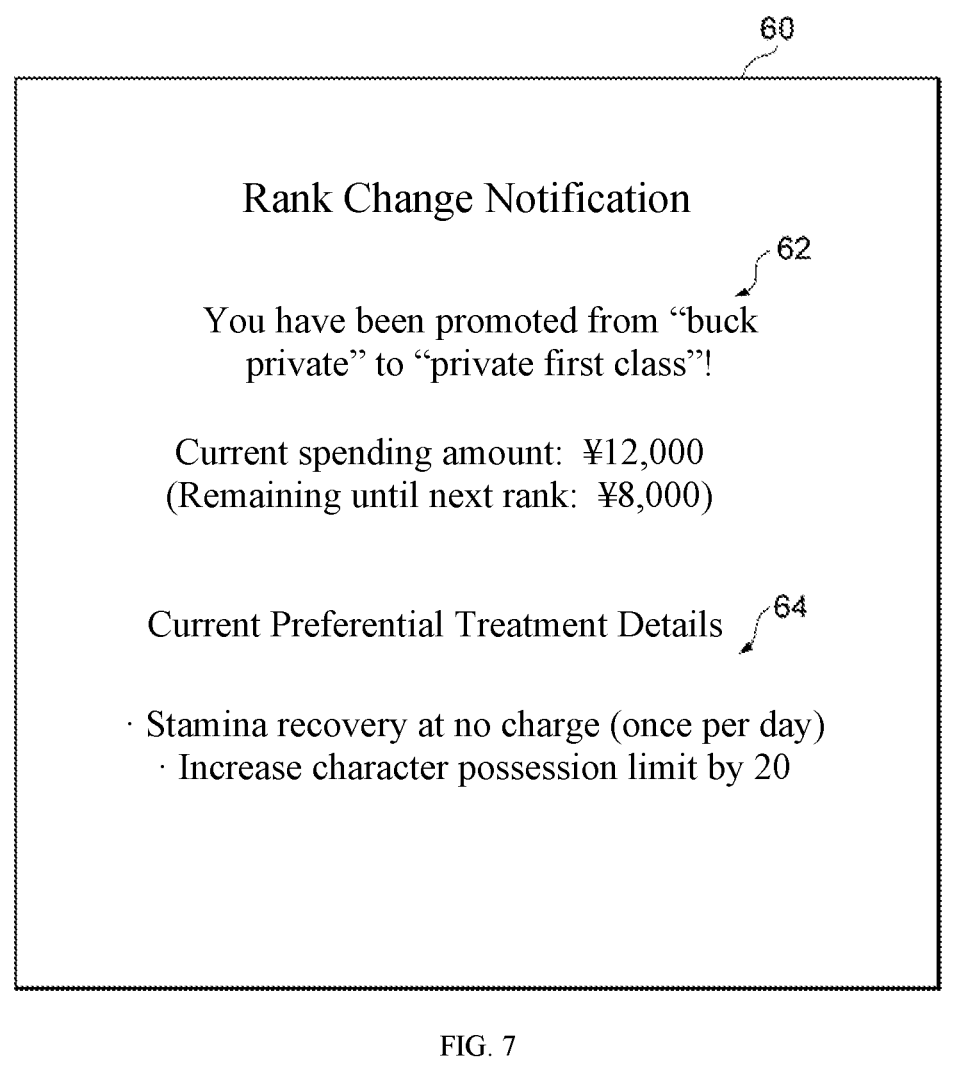

60

Rank Change Notification

62

You have been promoted from "buck private" to "private first class"!

Current spending amount: ¥12,000
(Remaining until next rank: ¥8,000)

Current Preferential Treatment Details   64

· Stamina recovery at no charge (once per day)
· Increase character possession limit by 20

Figure 8:
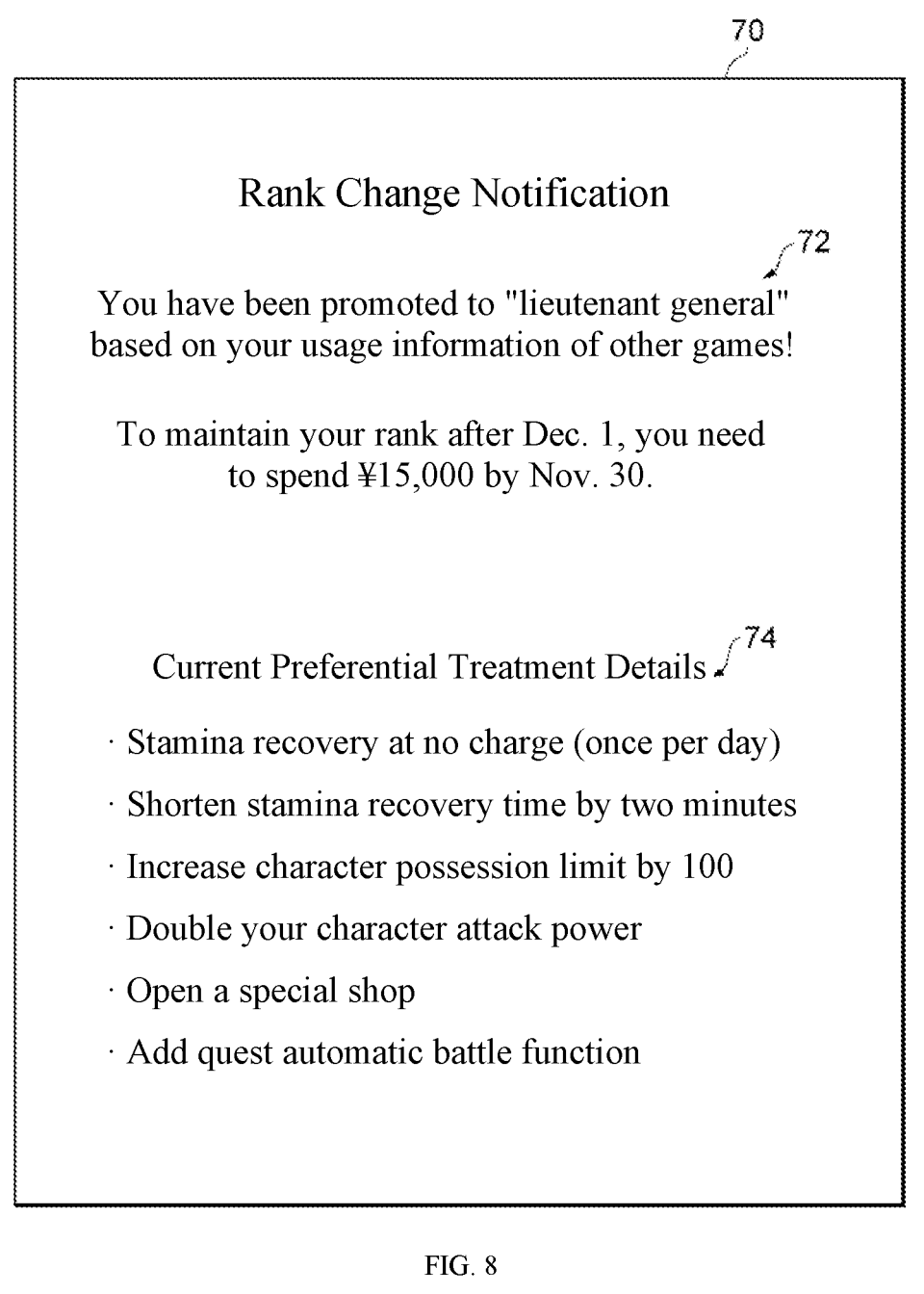

Rank Change Notification

72

You have been promoted to "lieutenant general" based on your usage information of other games!

To maintain your rank after Dec. 1, you need to spend ¥15,000 by Nov. 30.

74

Current Preferential Treatment Details

· Stamina recovery at no charge (once per day)

· Shorten stamina recovery time by two minutes

· Increase character possession limit by 100

· Double your character attack power

· Open a special shop

· Add quest automatic battle function

RECORDING MEDIUM AND INFORMATION PROCESSING DEVICE THAT GUIDE USER TO UTILIZE PLURAL FUNCTIONS

BACKGROUND

Technical Field

The present invention relates to a recording medium storing instructions and an information processing device.

Description of Related Art

A game in which a player is given preferential treatment upon purchasing virtual currency (charged items) has been known for some time.

In this regard, Patent Literature 1 discloses a technique in which a special shop (such as a specialty shop or a novelty shop) is made to pop up in accordance with the amount purchased or total purchase amount of a virtual currency.

PATENT LITERATURE

Japanese Patent No. 6,335,997

In such games, a player who has purchased a large amount of virtual currency has a tendency to continue playing that game. In other words, it is difficult to motivate a player using one function (playing a second game) and spending a large amount of money in the second game to use another function, namely, to play a first game.

SUMMARY

One or more embodiments of the present invention provide a technological improvement over such conventional technologies as discussed above. In particular, one or more embodiments of the present invention provide a recording medium storing instructions and an information processing device which guide a user using a function (e.g., playing a second game) to use another function (e.g., to play a first game) among plural functions given by an information processing device. As a result, for example, a player who spends a large amount of money in one game (e.g., the second game) can be guided to another game (e.g., the first game). This provides a practical, technological improvement over conventional technologies that would be readily appreciated by those skilled in the art, as will be discussed in further detail later.

According to a first aspect of the present invention, there is provided a non-transitory computer readable recording medium storing instructions that guide a user using a function to use another function among plural functions given by an information processing device, the instructions causing a computer to execute: giving preferential treatment to the user playing a first game depending on a first usage charge in the first game; acquiring usage information indicating a second usage charge in a second game; giving a predetermined license to the user, regardless of the first usage charge, under a condition that the second usage charge is equal to or greater than a certain amount; giving the preferential treatment, in the first game, to the user who has given the predetermined license.

According to a second aspect of the present invention, the instructions cause the computer to further execute: cancelling the preferential treatment in a case that the user who has given the predetermined license does not satisfy a specific condition in the first game within a specific period of time.

According to a third aspect of the present invention, the specific condition is that the first usage charge exceeds a first specific amount.

According to a fourth aspect of the present invention, the specific condition is that a usage frequency exceeds a specific number of times.

According to a fifth aspect of the present invention, the instructions cause the computer to further execute: setting a rank to the user playing the first game depending on the first usage charge, and with respect to the user who has started the first game without the predetermine license, giving the preferential treatment in a case that the rank of the user reaches a specific rank in the first game.

According to a sixth aspect of the present invention, the instructions cause the computer to further execute: with respect to the user who has started the first game without the predetermined license, giving the preferential treatment in a case that the first usage charge has exceeded a second specific amount.

According to a seventh aspect of the present invention, the second specific amount is greater than the first specific amount.

According to an eighth aspect of the present invention, the instructions cause the computer to further execute: setting a rank to the user playing the second game depending on the second usage charge, the usage information indicating the rank set to the user playing the second game, and giving the predetermined license to the user in a case that the rank set to the user playing the second game is a high rank.

According to a ninth aspect of the present invention, there is provided an information processing device that guides a user using a function to use another function among plural functions given by the information processing device, the information processing device comprising: a control device that executes: giving preferential treatment to the user playing a first game depending on a first usage charge in the first game, acquiring usage information indicating a second usage charge in a second game, giving a predetermined license to the user, regardless of the first usage charge, under a condition that the second usage charge is equal to or greater than a certain amount, and giving the preferential treatment, in the first game, to the user who has given the predetermined license.

In this way, one or more embodiments provide a practical improvement for effective utilization of the plural functions given by the information processing device. With one or more embodiments of the present invention, for example, a player who spends a large amount of money in one game can be guided to another game.

BRIEF DESCRIPTION OF DRAWINGS

FIG. 7 is a diagram showing an example of a rank change notification screen when the rank is changed according to a usage charge in one or more embodiments; and FIG. 8 is a diagram showing an example of the rank change notification screen when the rank is changed according to the predetermined license in one or more embodiments.

DETAILED DESCRIPTION

Figure 1:
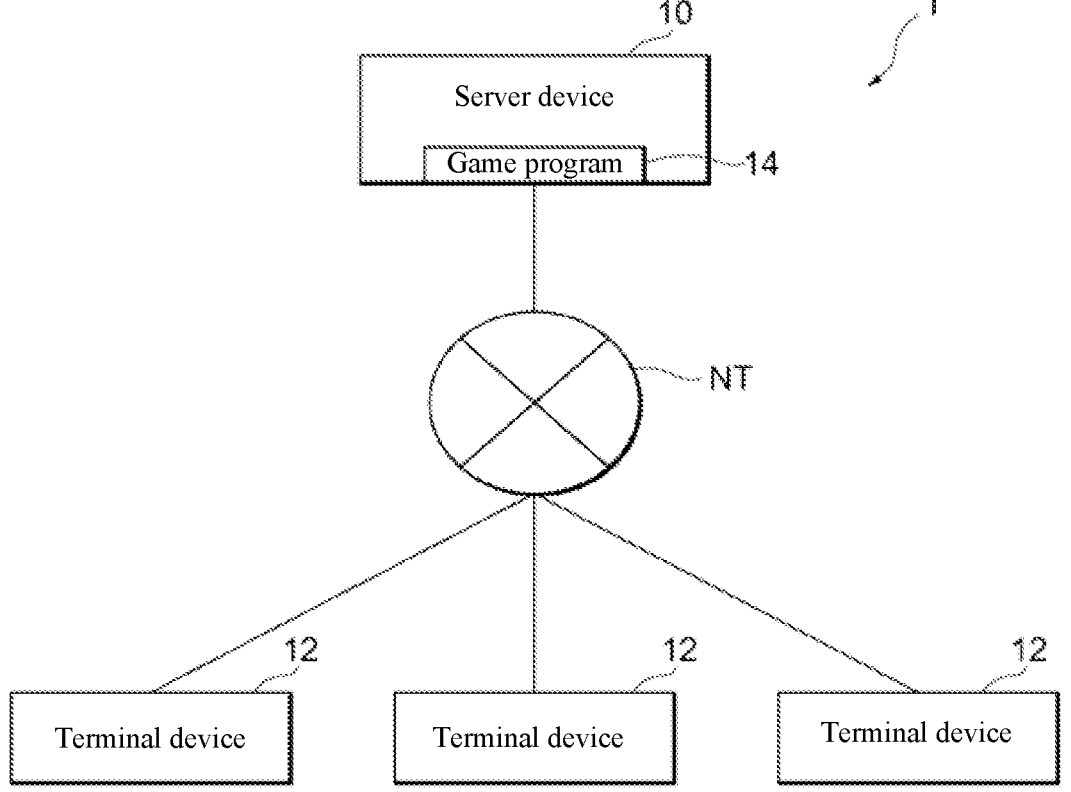
FIG. 1 is a block diagram showing an example of the overall configuration of a game system according to one or more embodiments.

Embodiments of the present invention will now be described with reference to the appended drawings. To facilitate understanding of the description, components and steps that are the same will be numbered the same as much as possible in the drawings, and redundant description will be omitted.

Overall Configuration

FIG. 1 is a block diagram showing an example of the overall configuration of a game system 1 according to one or more embodiments.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing instructions such as the game program 14, or the game program 14 itself, to the player of each terminal device 12 via the communication network NT. In one or more embodiments, the server device 10 provides the game program 14 itself to the players of the terminal devices 12.

Each terminal device 12 is an information processing device such as a game device belonging to a player, and is an information processing device that provides a game to a player by executing the game program 14 received from the server device 10 after the program has been installed. Examples of these terminal devices 12 include video game machines, arcade game machines, mobile phones, smartphones, tablets, personal computers, and various other such devices.

Hardware Configuration

Figure 2:
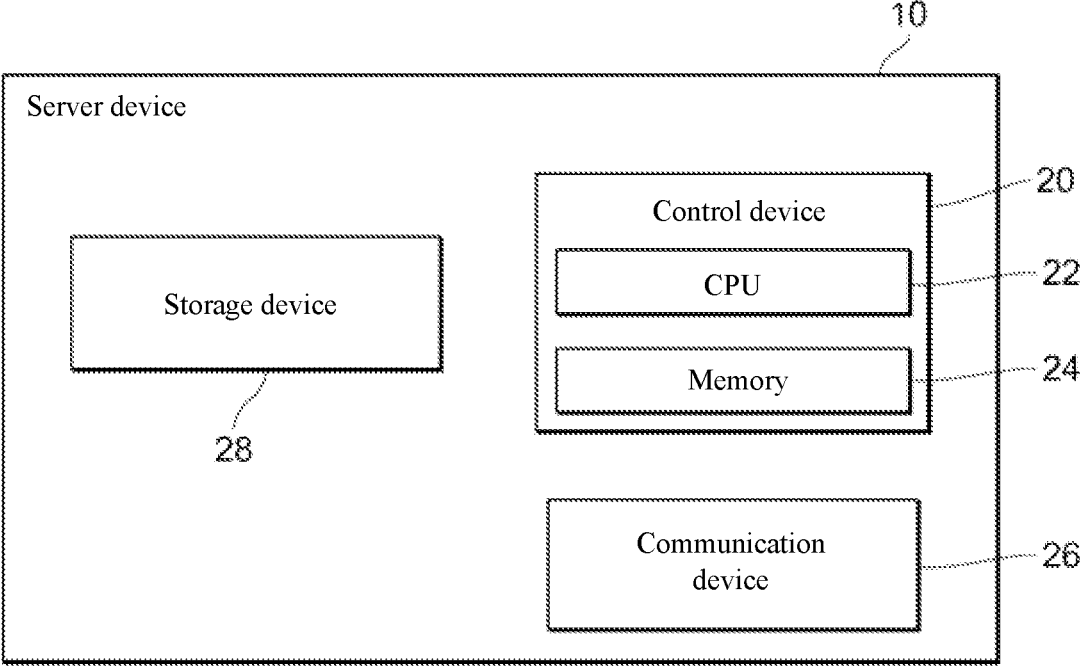
FIG. 2 is a diagram schematically showing an example of the hardware configuration of a server device.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional units by executing instructions such as specific programs stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of instructions such as programs and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for comprising operation means, a display device, and a sound output device, for example.

Figure 3:
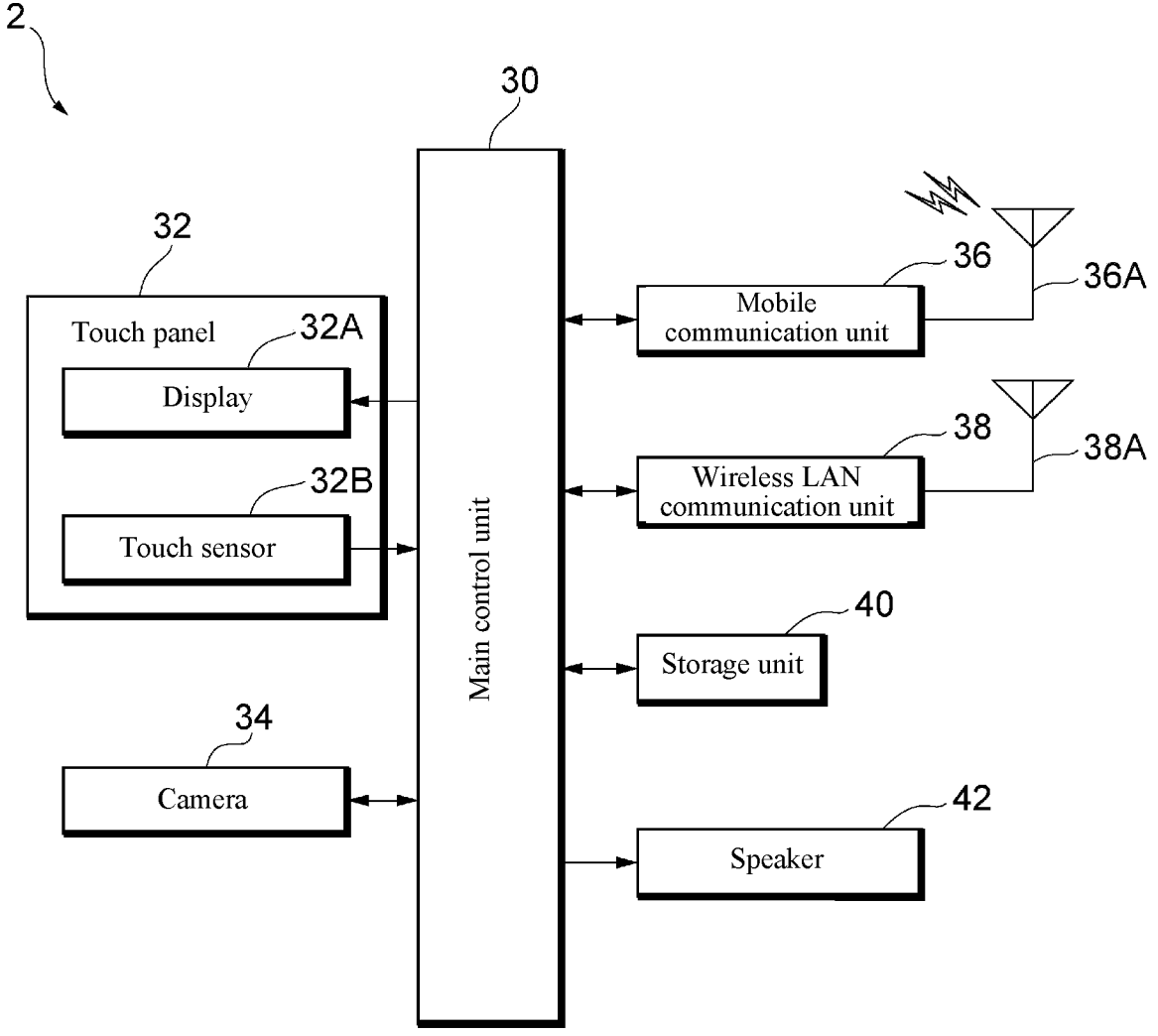
FIG. 3 is a diagram showing an example of the hardware configuration of a smart phone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit 30, a touch panel (touch screen) 32, a camera 34, a mobile communication unit 36, a wireless LAN communication unit 38, a storage unit 40, and a speaker 42.

The main control unit 30 includes a CPU, a memory, and the like. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of instructions including programs and data, such as the game program 14, and play data indicating player information or the progress of the game in the game program 14. This play data may be stored in the server device 10.

The speaker 42 has the function of outputting game sounds and so forth.

Game Overview

The first game (game A) according to one or more embodiments includes content purchasing (shops), lottery games, quests, and the like. These lottery games are sometimes referred to as gacha (loot box), raffle, summoning, or the like. These quests are sometimes referred to as battle games, dungeons, searches, missions, or the like.

Content purchasing in one or more embodiments is a game in which the player acquires, in a shop, one or more pieces of content selected as desired by the player in response to an instruction (request) from the player to purchase that content. This content purchasing is executed on the basis of the consumption of virtual currency owned by the player. Also, in a shop, each piece of content is associated with the amount of virtual currency required for purchase. Examples of this content include equipment items such as weapons and armor, stamina recovery items, continuation items, characters, cards, avatars, coins, points, and so on. Examples of virtual currency include paid currency and free currency. Paid currency is currency given to the player on the basis of payment (purchase procedure) made with money, prepaid card, credit card, or the like. This paid currency is sometimes referred to as paid stones, paid coins, paid medals, paid points, or the like. Free currency has a value equivalent to that of paid currency, but is given to the player free of charge in the game. This free currency is sometimes referred to as free stones, free coins, free medals, free points, or the like. Free currency may have a lower value than paid currency. For instance, content that can be purchased by spending only paid currency may have higher rarity (rarity value) and usefulness than content that can be purchased by spending free currency.

The lottery game according to one or more embodiments is a game in which a player is allowed to acquire one or more pieces of content randomly selected from the content group related to that lottery, in response to an instruction (request) from the player to execute a lottery game. This lottery is executed on the basis of the spending of virtual currency owned by the player. For example, in this lottery game, content that can be acquired by spending only paid currency may have a higher rarity (rarity value) and usefulness than content that can be obtained by spending free currency.

Also, a quest in one or more embodiments is a game in which a team made up of one or more characters associated with the player plays against enemy characters on the basis of an instruction (request) from the player to execute a quest. These quests are executed on the basis of consumption of stamina associated with the player. When a player spends virtual currency or consumes stamina recovery items, stamina is recovered in an amount that is the same as the player's stamina upper limit. Also, stamina is recovered by a specific amount at a time (such as 1) once the recovery time has elapsed. This recovery time is 3 minutes, for example. This stamina is sometimes referred to as life, action points (AP), battle points (BP), or the like. If the player cannot clear the quest, in other words, if the player cannot defeat all the enemy characters, the player can choose whether to continue the quest by spending virtual currency and continuation items, or to retire from the quest. This continuation refers to giving the player a continuation right to continue playing the quest. On the other hand, the player can obtain a clearance reward when the quest has been cleared, in other words, when all the enemy characters have been defeated. Clearance rewards include free currency (such as free stones), various items, enemy characters that appear in quests, experience points for raising the player's level, and so on.

Also, in the first game (game A) according to one or more embodiments, preferential treatment is given to the player in the first game according to a player's spending usage (or a first usage charge) in the first game. Examples of this spending usage include the cumulative virtual currency purchase amount or monthly billing amount since the player started the game, the virtual currency purchase amount and monthly billing amount for a specific period of time (such as a week, a month, or a year), etc. In one or more embodiments, if the player starts the game without a preferential status (or a predetermined license), preferential treatment is provided if the player's spending usage exceeds a second specific amount. In the first game according to one or more embodiments, a rank is set for the player according to the player's spending usage in the first game, and preferential treatment corresponding to that rank is given to the player. This rank is a value or title indicating the position of the player in the game, and may also be referred to as standing, class, grade, level, status, or the like. For example, when the player's spending usage exceeds 5,000 yen, the player is assigned the rank (standing) of private, and when the amount exceeds 10,000 yen, the player is assigned the rank of private first class. When the rank set for the player is equal to or higher than a specific rank (such as private first class), that is, when the player's spending usage exceeds the second specific amount (such as 10,000 yen), the player is given preferential treatment. Examples of this preferential treatment include: shortening the recovery time for stamina, character HP, etc.; providing the right to recover stamina and character HP free of charge; increasing character ability parameters; character evolution without consumption of evolution resources; the addition of games (lottery games, quests, special shops) in which content of high rarity and usefulness can be acquired; the addition of automatic battle function for quests; an increase in rewards for clearing quests; the addition of discounts and benefits (bonuses) upon purchasing content; increasing the upper limit of the number of players (usage limit), and the like. Examples of the upper limit of usage include the number of characters that can be possessed (possession limit), the number of friends that can be registered (registration limit), the number of team formations including characters that can be stored (formation limit), the number of points that can be acquired in a specific time interval (point limit), the number of purchases of content (number of times limit), the number of items or characters that can be transferred or lent to other players (transfer limit or loan limit), the number of commands and strategies that can be selected by the user when executing a quest (selection limit), and so forth. The amount and quality of this preferential treatment will vary according to the rank set for the player. For example, the higher is the rank, the higher are the amount and quality.

Functional Units

Figure 4:
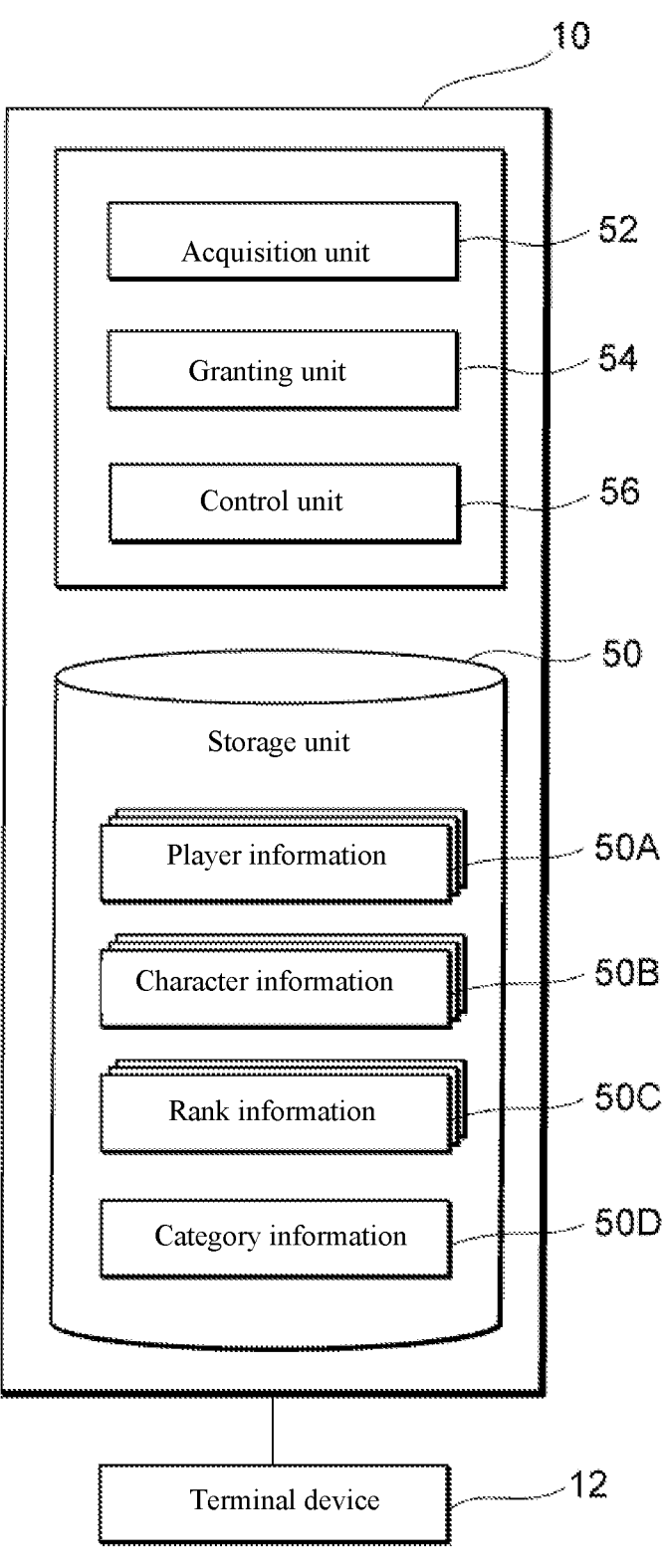
FIG. 4 is a block diagram showing an example of the functional configuration of a server device.

FIG. 4 is a block diagram showing an example of the functional configuration of the server device 10.

As shown in FIG. 4, the server device 10 comprises, as functional components, a storage unit 50, an acquisition unit 52, a granting unit 54, and a control unit 56. The storage unit 50 is realized in the form of one or more storage devices 28. Functional units other than the storage unit 50 are realized when the control device 20 execute the game program 14 stored in the storage device 28 or the like.

The storage unit 50 is a functional unit for storing player information 50A, character information 50B, rank information 50C, category information 50D, and the like.

Player information 50A is stored for each player in association with the player ID of that player. The player information 50A includes, for example, the player's name and age, possessed character information, virtual currency information, stamina information, spending usage information (or usage charge information), preferential status information (or license information), and set rank.

Possessed character information includes the character ID and ability parameters of each character possessed by the player (possessed character). Ability parameters are, for example, a character's level, hit points, attack power, defense power, and the like. The level increases as a character acquires character experience points through fusion or the like. As a character's level increases, its hit points, attack power, defense power, and so forth also increase.

Virtual currency information includes the amount of virtual currency owned by the player. For example, virtual currency information includes the amount of paid currency and the amount of free currency.

Stamina information includes the current stamina value and the stamina upper limit value. The current stamina value is the stamina (value) associated with the player. The stamina upper limit increases as the player's level increases. The player level increases, for example, when the player acquires player experience points by playing games (such as quests or missions).

Spending usage information includes the amount the player has spent and the date and time of this spending. This spending usage includes, for example, the total amount of virtual currency purchased since the player started the game (new installation). The spending date and time includes the date and time when the player purchased virtual currency.

Preferential status information includes the presence or absence of a preferential status (or a predetermined license), the category, and the date and time the status was granted. The presence or absence of the preferential status is flag information indicating whether or not the preferential status has been granted to the player by a granting unit 54. The category includes numerical values from 1 to 3, for example, as categories of the preferential status granted to the player. The granting date and time includes the date and time when the preferential status was granted to the player.

Set rank includes the rank (class) set for the player. There are 20 ranks, for example, from buck private (rank 1) to general of the army (rank 20). For example, if the player has the preferential status, the rank is set regardless of the player's spending usage. In this case, the higher is the category of the preferential status, the higher the rank of the player is set. On the other hand, if the player does not have the preferential status, the rank is set according to the player's spending usage. Even though a player has the preferential status, the rank set for that player may be set to a higher rank according to the player's spending usage.

Character information 50B is stored for each character in association with the character ID of that character. This character information 50B includes, for example, the character name or image (design), rarity, initial values (such as hit points, attack power, defense power, etc., at level 1) and upper limit values (such as hit points, attack power, defense power, etc., at level 100) of ability parameters, and skills. Rarity includes, for example, a number from 1 to 6. This number may be indicated by the number of stars, for example. Here, characters with high rarity are set to have ability parameters and skills that are advantageous for the game (such as in quests and missions).

Rank information 50C is stored for each rank in the first game in association with the rank ID for that rank. This rank information 50C includes, for example, the name of the rank, the attainment amount, preferential treatment information, and the like.

Attainment amount includes, for each rank, the lower limit spending usage (specific spending usage) for attaining that rank. This lower limit spending usage increases as the rank increases. This lower limit spending usage is, for example, 0 yen for a buck private (rank 1), 5,000 yen for a private (rank 2), and 10,000 yen for a private first class (rank 3). For example, if the player spends 8,000 yen in the first game, the rank of the player is set to private (rank 2).

Preferential treatment information includes, for each rank, the preferential treatment to be provided for that rank. The higher is the rank, the higher are the quantity and quality of this preferential treatment. For example, neither buck private (rank 1) nor private (rank 2) includes any preferential treatment. Also, for example, ranks from captain (rank 11) to colonel (rank 15) include the preferential treatment of shortening the stamina recovery time by one minute. Also, for example, ranks from brigadier general (rank 16) to general of the army (rank 20) include the preferential treatment of shortening the stamina recovery time by two minutes. Also, for example, ranks from private first class (rank 3) to general of the army (rank 20) include the preferential treatment of being able to recover stamina at no charge once a day.

Category information 50D includes usage information for a second game that is different from the first game (game A) and a corresponding rank for each preferential status (or license) category.

Usage information includes a higher rank in the second game (game B or game C) for each preferential status category. For example, the rank of the second game increases if the player's spending usage exceeds the attainment amount for each rank, just as in the first game. Also, in the second game, the higher is the rank, the higher are the quantity and quality of preferential treatment provided to the player. This higher rank is, for example, a rank at which the attainment amount in the second game is equal to or greater than a certain amount (such as 50,000 yen). For example, the usage information includes a higher rank in the second game, that is, a rank with a higher attainment amount, as the category of preferential status is higher. For instance, category 1 includes rank 3 of game B, or ranks 20-24 of game C. Also, category 2 includes rank 4 of game B and ranks 25-29 of game C, for example. Also, category 3 includes rank 5 or higher of game B, or rank 30 or higher of game C, for example.

Corresponding ranks include the rank of the first game for each category of preferential status. For example, category 1 includes second lieutenant (rank 9). Also, category 2 includes major (rank 13), for example. Also, category 3 includes lieutenant general (rank 18), for example.

The acquisition unit 52 is a functional unit for acquiring various kinds of information. In one or more embodiments, the acquisition unit 52 acquires usage information indicating the player's spending usage (or a second usage charge) in the second game, which is different from the first game. For example, the acquisition unit 52 acquires usage information from a server device (external server) that manages the second game, or from a terminal device 12 of the player. More specifically, the acquisition unit 52 receives an input of a player ID in game B, which is the second game, from the player, and acquires the rank of the player in game B from the server device that manages game B. Also, the acquisition unit 52 acquires, from the terminal device 12 of the player, information with which the player's rank in game C, which is the second game, can be identified. This information includes, for example, a screen capture of the screen displaying the rank in game C, a URL associated with that screen, an input code indicating the rank, or the like.

The granting unit 54 is a functional unit for granting a preferential status (or giving a predetermined license) to the player. In one or more embodiments, if the spending usage indicated by the usage information acquired by the acquisition unit 52 is equal to or greater than a certain amount (such as 50,000 yen), the granting unit 54 grants preferential status to the player regardless of the player's spending usage in the first game. More specifically, the granting unit 54 analyzes the screen capture in game C acquired by the acquisition unit 52 and identifies the rank of the player in game C. Then, if the identified rank of the player in game C is included in any category of the category information 50D, that is, if the attainment amount for the rank is equal to or greater than a certain amount, the granting unit 54 grants the player preferential status for that category. More specifically, if a player's rank in game C is 31, the granting unit 54 grants category 3 preferential status to that player.

Meanwhile, if the rank in the second game acquired by the acquisition unit 52 is not included in any category of the category information 50D, that is, if the attainment amount for the rank in the second game is less than a certain amount, the granting unit 54 does not grant preferential status to the player. In other words, if the rank set for a player in the second game is not a higher rank, the granting unit 54 does not grant preferential status to that player.

The control unit 56 is a functional unit for controlling the progress of various games in the first game. In one or more embodiments, the control unit 56 gives preferential treatment to a player who has preferential status in the first game. For example, the control unit 56 sets a rank in the first game corresponding to the category of the preferential status for a player to whom preferential status has been granted by the granting unit 54. More specifically, the control unit 56 sets the rank of the player to second lieutenant (rank 9) if the category of preferential status held by the player is 1, sets the rank of the player to major (rank 13) if the category of preferential status is 2, and sets the rank of the player to lieutenant general (rank 18) if the category of preferential status is 3. Then, the control unit 56 refers to the rank information 50C and provides the player with the preferential treatment included in the set rank.

Also, if a player having preferential status does not satisfy a specific condition in the first game within a specific period of time, the control unit 56 cancels the preferential treatment for that player. Examples of this specific period of time include within three months and within six months from the date when the player was granted preferential status. The specific condition includes, for example, that the player's spending usage in the first game exceeds a first specific amount. An example of this first specific amount is 5,000 yen. For instance, when three months have passed since preferential status was granted, if the player's spending usage has not yet exceeded 5,000 yen, the control unit 56 sets the player's rank to buck private (rank 1), and cancels the player's preferential treatment. Also, the specific condition includes that the player's usage frequency of the first game exceeds a specific number of times. The usage frequency includes, for example, login frequency, stamina recovery frequency, number of times a quest has been cleared, and virtual currency purchase frequency. For example, if the player's login frequency (number of times) within three months after the player was granted preferential status has not exceeded a specific number (such as 50 times), the control unit 56 sets the player's rank to buck private (rank 1) and cancels the preferential treatment for that player.

On the other hand, if a player who has preferential status has satisfied a specific condition in the first game within a specific period of time, the control unit 56 continues preferential treatment for that player. For instance, when three months have passed since category 1 preferential status was granted, if the player's spending usage exceeds 5,000 yen, the control unit 56 maintains the player's rank at second lieutenant (rank 9), and continues preferential treatment for that player for the next specific period of time (such as three months later).

Also, the control unit 56 provides preferential treatment to a player who has started the first game without having preferential status if that player reaches a specific rank in that first game. For example, the control unit 56 refers to the player information 50A and the rank information 50C, and provides preferential treatment if the spending usage of a player who started the first game without having preferential status has exceeded an attainment amount (such as 10,000 yen) associated with a specific rank (such as private first class).

Also, the control unit 56 provides preferential treatment to a player who has started the first game without having preferential status if that player's spending usage exceeds a second specific amount. This second specific amount is, for example, the attainment amount (such as 10,000 yen) associated with private first class (rank 3) for which the provision of preferential treatment is started in the rank information 50C. This second specific amount is, for example, larger than the first specific amount (such as 5,000 yen). This second specific amount may be determined regardless of the attainment amount for the rank in the rank information 50C.

Flow of Processing for Granting Preferential Status

Figure 5:
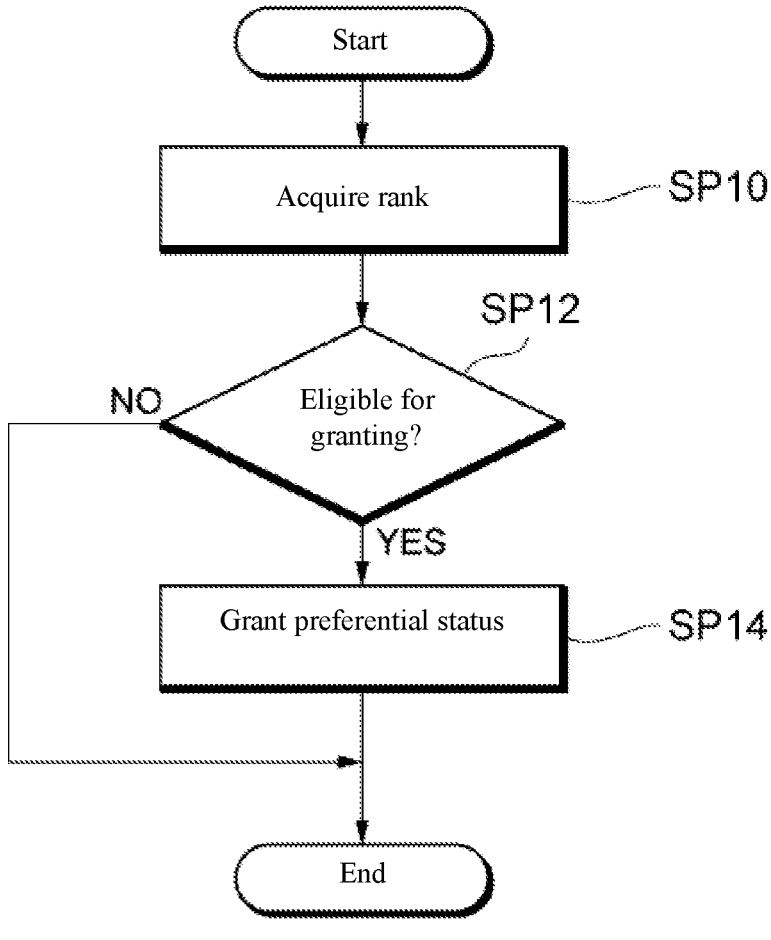
FIG. 5 is a flowchart showing an example of the flow of processing for giving a predetermined license in the game system according to one or more embodiments.

FIG. 5 is a flowchart showing an example of the flow of processing for granting a preferential status in the game system according to one or more embodiments. Also, the processing of the following steps is commenced, for example, at the point when the player issues an instruction to register the rank of the second game (usage information). The order and details of the following steps can be changed as needed.

Step SP10

The acquisition unit 52 acquires the rank of the player in the second game as usage information indicating the player's spending usage in the second game. For example, the acquisition unit 52 acquires from the terminal device 12 of the player a screen capture from game C with which the rank of the player in game C, which is the second game, can be identified. The processing then moves to the processing of step SP12.

Step SP12

The granting unit 54 analyzes the screen capture from game C acquired in step SP10 and identifies the rank of the player in game C. The granting unit 54 then determines whether or not the identified rank of the player in game C is included in any category of the category information 50D, that is, whether or not the attainment amount for the rank is equal to or greater than a certain amount. Then, if the determination is affirmative, the processing moves to the processing of step SP14. On the other hand, if the determination is negative, the processing ends the series of processing shown in FIG. 5.

Step SP14

The granting unit 54 grants the player the preferential status for the category in the category information 50D corresponding to the player's rank in game C. More specifically, the granting unit 54 registers (stores) the preferential status, the category, and the granting date and time in the preferential status information of the player information 50A. The processing then ends the series of processing shown in FIG. 5.

Processing Flow

Figure 6:
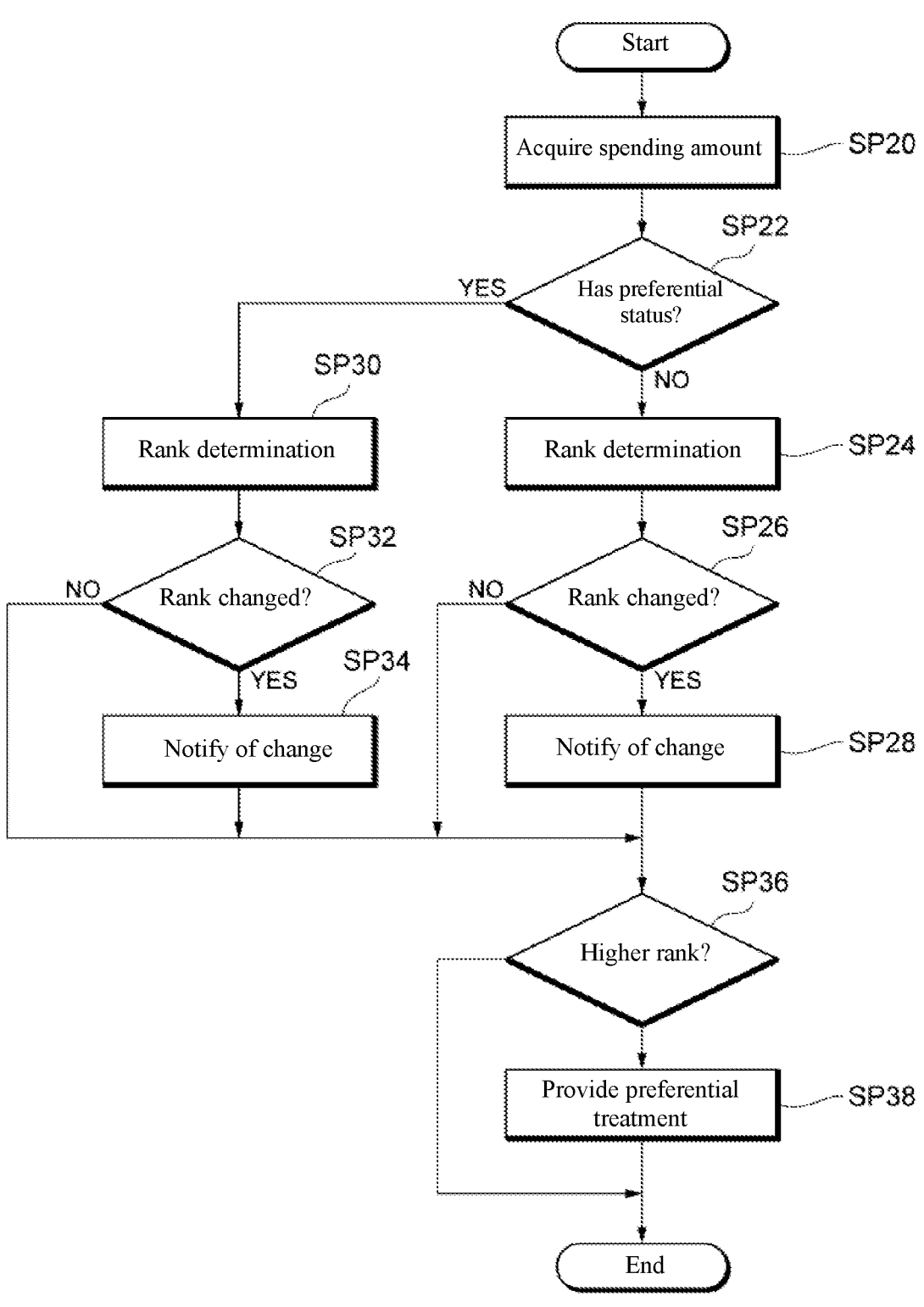
FIG. 6 is a flowchart showing an example of the flow of processing performed by functional units shown in FIG. 4 in the game system according to one or more embodiments.

FIG. 6 is a flowchart showing an example of the flow of processing performed by functional units shown in FIG. 4 in the game system according to one or more embodiments. Also, the processing of the following steps is commenced, for example, at the point when the player logs into a game or when the player purchases virtual currency. The order and details of the following steps can be changed as needed.

Step SP20

The acquisition unit 52 acquires the player's spending usage in the first game. More specifically, the acquisition unit 52 acquires the player's spending usage by referring to the spending usage information of the player information 50A. The processing then moves to the processing of step SP22.

Step SP22

The control unit 56 determines whether or not a player has the preferential status. More specifically, the control unit 56 refers to the preferential status information in the player information 50A to determine whether or not the player has the preferential status. If the determination is affirmative, the processing moves to the processing of step SP30. On the other hand, if the determination is negative, the processing moves to the processing of step SP24.

Step SP24

The control unit 56 sets the player's rank according to the player's spending usage acquired in step SP20. More specifically, the control unit 56 refers to the rank information 50C to determine whether or not the spending usage exceeds each of the attainment amounts (lower limit amounts), from the lowest rank (buck private) to the highest rank (general of the army), in order. After this, the control unit 56 determines, as the player's rank, the highest rank among the ranks corresponding to the attainment amount that the spending usage exceeds. The processing then moves to the processing of step SP26.

Step SP26

The control unit 56 refers to the set rank in the player information 50A and determines whether or not the rank set for the player so far differs from the rank determined in step SP24. If the determination is affirmative, the processing then moves to the processing of step SP28. On the other hand, if the determination is negative, the processing moves to the processing of step SP36.

Step SP28

The control unit 56 notifies the player of notification information, including that the rank has been changed according to the spending usage. For example, the control unit 56 displays a rank change notification screen 60 on a touch panel 32 of the terminal device 12 owned by the player.

FIG. 7 is a diagram showing an example of the rank change notification screen 60 when the rank has been changed according to the spending usage in one or more embodiments.

As shown in FIG. 7, the rank change notification screen 60 is provided with a rank information area 62 and a preferential treatment information area 64. The rank information area 62 shows the previous rank that had been set for the player, the rank to be changed to, the current spending usage, and the spending usage up to the next rank. The preferential treatment information area 64 displays a list of preferential treatments associated with the rank to be changed to.

Going back to FIG. 6, the processing moves to the processing of step SP36.

Step SP30

The control unit 56 determines the rank of the player according to the preferential status information referred to in step SP22. More specifically, the control unit 56 refers to the category information 50D and determines the rank (such as lieutenant general) corresponding to the category (such as 3) included in the preferential status information as the rank to be set for the player. The control unit 56 refers to the rank information 50C, and may determine the rank corresponding to the attainment amount as the rank to be set for the player in the event that the player's spending usage acquired in step SP20 exceeds the attainment amount (lower limit amount) corresponding to a rank higher than the rank set according to the preferential status. The processing then moves to the processing of step SP32.

Step SP32

The control unit 56 refers to the set rank in the player information 50A and determines whether or not the rank set for the player so far is different from the rank determined in step SP30. If the determination is affirmative, the processing moves to the processing of step SP34. On the other hand, if the determination is negative, the processing moves to the processing of step SP36.

Step SP34

The control unit 56 notifies the player of notification information, including that the rank has been changed according to the spending usage. For example, the control unit 56 displays a rank change notification screen 70 on the touch panel 32 of the terminal device 12 owned by the player.

FIG. 8 is a diagram showing an example of the rank change notification screen 70 when the rank has been changed according to the preferential status in one or more embodiments.

As shown in FIG. 8, the rank change notification screen 70 is provided with a rank information area 72 and a preferential treatment information area 74. The rank information area 72 shows the rank set for the player, the spending usage for maintaining (continuing) the rank after a specific period of time, and so forth. The preferential treatment information area 74 displays a list of preferential treatments associated with the rank to be changed to.

Going back to FIG. 6, the processing moves to the processing of step SP36.

Step SP36

The control unit 56 updates the set rank in the player information 50A to the rank determined in step SP24 or step SP30. After this, the control unit 56 determines whether or not the updated rank is a higher rank. More specifically, the control unit 56 refers to the rank information 50C and determines whether or not the updated rank includes preferential treatment. If the determination is affirmative, the processing moves to the processing of step SP38. On the other hand, if the determination is negative, the processing ends the series of processing shown in FIG. 6.

Step SP38

The control unit 56 refers to the preferential treatment information in the rank information 50C and provides the preferential treatment corresponding to the rank updated in step SP36. The processing then ends the series of processing shown in FIG. 6.

As described above, one or more embodiments provide a practical improvement for effective utilization of plural functions given by the information processing device. With one or more embodiments of the present invention, the recording medium storing instructions and the information processing device guide the user using a function (e.g., playing the second game) to use another function (e.g., to play the first game) among the plural functions given by the information processing device. Specifically, in one or more embodiments, a recording medium storing instructions that give preferential treatment to a player in a first game according to the player's spending usage in the first game, causes a computer to function as an acquisition unit 52 for acquiring usage information indicating a player's spending usage in a second game that is different from the first game, a granting unit 54 for granting the preferential status to the player regardless of the player's spending usage in the first game in the event that the player's spending usage in the second game is equal to or greater than a certain amount, and a control unit 56 for giving preferential treatment to a player who has the preferential status in the first game.

With this configuration, if a player's spending usage in the second game is equal to or greater than a certain amount, that player is given preferential treatment in the first game regardless of the player's spending usage in the first game, so that player can be guided from the second game to the first game.

Also, in one or more embodiments, if a player having the preferential status does not satisfy a specific condition in the first game within a specific period of time, the control unit 56 cancels the preferential treatment for that player.

With this configuration, a player who has preferential treatment can be motivated to play the first game within a specific period of time, thereby conveying to the player how much fun the first game is.

Also, in one or more embodiments, the specific condition includes that the player's spending usage exceeds a first specific amount.

With this configuration, it is possible to increase the player's spending usage in the first game, so that player can be motivated to continue playing the first game.

Also, in one or more embodiments, the specific condition includes that the player's usage frequency exceeds a specific number.

With this configuration, the player's usage frequency can be increased in the first game, thereby motivating the player to continue playing the first game.

Also, in one or more embodiments, in the first game, a rank corresponding to the player's spending usage in the first game is set for the player, and the control unit 56 provides preferential treatment to a player who has started the first game without having the preferential status if that player has reached a specific rank in the first game.

With this configuration, preferential treatment is not provided to a player who has started the first game without having the preferential status unless the player has reached a specific rank, whereas preferential treatment is provided from the outset to a player who has the preferential status, so a player whose spending usage in the second game is equal to or greater than a certain amount can be motivated to play the first game.

Also, in one or more embodiments, the control unit 56 provides preferential treatment to a player who has started the first game without the preferential status if the player's spending usage exceeds a second specific amount.

With this configuration, preferential treatment is not provided to a player who has started the first game without having the preferential status unless the player has reached a second specific amount, whereas preferential treatment is provided from the outset to a player who has the preferential status, so a player whose spending usage in the second game is equal to or greater than a certain amount can be motivated to play the first game.

Also, in one or more embodiments, the second specific amount is greater than the first specific amount.

With this configuration, a player who has the preferential status can avoid cancellation of preferential treatment with a spending usage that is less than the spending usage for which preferential treatment is provided to a player who does not have the preferential status, so a player whose spending usage in the second game is equal to or greater than a certain amount can be motivated to play the first game.

Also, in one or more embodiments, in the second game, a rank corresponding to a player's spending usage in the second game is set for that player, and the usage information is the rank set for the player in the second game, and the granting unit 54 grants the preferential status to that player if the rank set for the player in the second game is a higher rank.

With this configuration, preferential treatment in the first game can be provided to a player for whom a higher rank has been set in the second game, so that player can be motivated to play the first game.

Modification Examples

The present invention is not limited to or by the above specific examples. That is, suitable design changes made by a person skilled in the art to the above specific examples are also encompassed by in the scope of the present invention as long as they still have the features of the present invention. Also, the elements of the embodiments described above and the modified example (discussed below) can be combined to the extent that this is technically possible, and these combinations are also encompassed by the scope of the present invention as long as they still have the features of the present invention.

For example, in the above embodiments, a case was described in which the usage information in the second game (game B or game C) was the rank of the player, but may instead be information indicating the player's spending usage in the second game, or the player level, possessed content, ranking order, or the like. For example, if the player level in the second game is at least a certain value, the granting unit 54 grants the player the preferential status in a category corresponding to that player level. Also, for example, if the player owns at least a certain number of specific types of content that are difficult to obtain in the second game, the granting unit 54 grants that player the preferential status in a category corresponding to the number of pieces of specific content owned. Also, for example, if the player owns at least a certain number of trophies that can be acquired by winning battle games in the second game, the granting unit 54 grants the player the preferential status in a category corresponding to the number of trophies owned. Also, for example, if the player's ranking in the second game is within a certain ranking (such as 100th place), the granting unit 54 grants the player the preferential status in a category corresponding to that ranking.

Also, in the above embodiments, the player's rank was set according to the player's spending usage or the preferential status, but may instead be set by taking into account the player's level, the usage frequency of the game, or the like.

Also, in the above embodiments, a case was described in which the control unit 56 canceled the preferential treatment for a player having the preferential status who did not satisfy a specific condition in the first game within a specific period of time, but this period of time may be changed depending on the category of the preferential status granted to the player. More specifically, the specific period of time may be three months for category 1 preferential status, four months for category 2 preferential status, and six months for category 3 preferential status.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

10 . . . server device (computer), 12 . . . terminal device, 50 . . . storage unit, 52 . . . acquisition unit, 54 . . . granting unit, 56 . . . control unit

What is claimed is:

1. A non-transitory computer readable recording medium storing instructions causing an information processing device to execute:

communicating with a terminal device belonging to a game player via a network;

causing the terminal device to execute a first game and a second game;

monitoring and accumulating a first usage charge spent by the game player in the first game within a specific period of time;

giving preferential treatment in the first game to the game player depending on the first usage charge;

storing, in a storage, category information indicating usage information of the second game and a corresponding rank, for each category of preferential license;

causing the terminal device to capture an image of a screen on which a rank of the game player is displayed, with an internal camera during the second game;

analyzing the captured image to identify a rank set to the game player playing the second game;

upon identifying that the identified rank is included in any category in the category information, identifying that the second usage charge is equal to or greater than a certain amount;

giving a predetermined license in the first game to the game player, regardless of the first usage charge, under a condition that the second usage charge is equal to or greater than the certain amount;

with respect to the game player who has not been given the predetermined license, setting a rank corresponding to a highest attainment amount to the game player by confirming whether the first usage charge exceeds each of different attainment amounts in order from lowest to highest attainment amounts;

with respect to the game player who has been given the predetermined license, setting a rank corresponding to the predetermined license, or in a case where the first usage charge exceeds an attainment amount of a higher rank than the rank corresponding to the predetermined license, setting the higher rank;

giving the preferential treatment in the first game, to the game player who has been given the predetermined license; and causing a display input device of the terminal device to display a notification indicating the predetermined license and the preferential treatment given to the game player in the first game correspondingly to the predetermined license, the notification timely reflecting the first usage charge having been spent until a present time and further indicating a remaining usage charge necessary for rank-up.

2. The non-transitory computer readable recording medium according to claim 1, wherein the instructions cause the information processing device to further execute:

cancelling the preferential treatment in a case that the game player who has been given the predetermined license does not satisfy a specific condition in the first game within a specific period of time.

3. The non-transitory computer readable recording medium according to claim 2, wherein the specific condition is that the first usage charge exceeds a first specific amount.

4. The non-transitory computer readable recording medium according to claim 3, wherein the specific condition is that a usage frequency exceeds a specific number of times.

5. The non-transitory computer readable recording medium according to claim 3, wherein the instructions cause the information processing device to further execute:

with respect to the game player who has started the first game without the predetermined license, giving the preferential treatment in a case that the first usage charge has exceeded a second specific amount.

6. The non-transitory computer readable recording medium according to claim 5, wherein the second specific amount is greater than the first specific amount.

7. The non-transitory computer readable recording medium according to claim 1, wherein the instructions cause the information processing device to further execute:

setting a rank to the game player playing the second game depending on the second usage charge, the usage information indicating the rank set to the game player playing the second game, and giving the predetermined license to the game player in a case that the rank set to the game player playing the second game is a high rank.

8. The non-transitory computer readable recording medium according to claim 1, wherein the preferential treatment is maintained provided that the game player meets a predetermined condition within a specific period of time in the first game, but canceled under a condition that the game player does not meet the predetermined condition within the specific period of time in the first game.

9. An information processing device comprising:

a storage; and a control device that executes:

communicating with a terminal device belonging to a game player via a network, causing the terminal device to execute a first game and a second game, giving preferential treatment in the first game to the game player depending on the first usage charge, reading out, from the storage, usage information indicating a second usage charge spent by the game player in a second game, storing, in a storage, category information indicating usage information of the second game and a corresponding rank, for each category of preferential license, causing the terminal device to capture an image of a screen on which a rank of the game player is displayed, with an internal camera during the second game, analyzing the captured image to identify a rank set to the game player playing the second game, upon identifying that the identified rank is included in any category in the category information, identifying that the second usage charge is equal to or greater than a certain amount, giving a predetermined license in the first game to the game player, regardless of the first usage charge, under a condition that the second usage charge is equal to or greater than the certain amount, with respect to the game player who has not been given the predetermined license, setting a rank corresponding to a highest attainment amount to the game player by confirming whether the first usage charge exceeds each of different attainment amounts in order from lowest to highest attainment amounts, with respect to the game player who has been given the predetermined license, setting a rank corresponding to the predetermined license, or in a case where the first usage charge exceeds an attainment amount of a higher rank than the rank corresponding to the pre-determined license, setting the higher rank, giving the preferential treatment in the first game, to the game player who has been given the predetermined license, and causing a display input device of the terminal device to display a notification indicating the predetermined license and the preferential treatment given to the game player in the first game correspondingly to the predetermined license, the notification timely reflecting the first usage charge having been spent until a present time and further indicating a remaining usage charge necessary for rank-up.

\*　\*　\*　\*　\*